(12) United States Patent
Zenere et al.

(10) Patent No.: US 11,492,068 B2
(45) Date of Patent: Nov. 8, 2022

(54) CONTROL DEVICE OF A HYDRAULIC BRAKE, BRAKING MEMBER AND HYDRAULIC BRAKING SYSTEM FOR A BICYCLE AND METHOD FOR STORING AND TRANSPORTING A HYDRAULIC BRAKING SYSTEM FOR A BICYCLE

(71) Applicant: CAMPAGNOLO S.r.l., Vicenza (IT)

(72) Inventors: Davide Zenere, Vicenza (IT); Michele Fassina, Vigonza (IT)

(73) Assignee: CAMPAGNOLO S.R.L., Vicenza (IT)

( * ) Notice: Subject to any disclaimer, the term of this patent is extended or adjusted under 35 U.S.C. 154(b) by 363 days.

(21) Appl. No.: 16/700,221

(22) Filed: Dec. 2, 2019

(65) Prior Publication Data

US 2020/0172193 A1 Jun. 4, 2020

(30) Foreign Application Priority Data

Dec. 3, 2018 (IT) .................... 102018000010758

(51) Int. Cl.
  *B62L 3/02* (2006.01)
  *B62L 1/06* (2006.01)
  *F16D 25/08* (2006.01)
  *F16D 121/04* (2012.01)
  *F16D 125/02* (2012.01)

(52) U.S. Cl.
  CPC ............... *B62L 3/023* (2013.01); *B62L 1/06* (2013.01); *F16D 25/083* (2013.01); *F16D 2121/04* (2013.01); *F16D 2125/02* (2013.01)

(58) Field of Classification Search
  CPC ..... B62L 3/02; B62L 3/023; B62L 1/06; F16D 25/083; F16D 2121/04; F16D 2125/02
  See application file for complete search history.

(56) References Cited

U.S. PATENT DOCUMENTS

| 9,227,692 B2 | 1/2016 | Kariyama |
| 2008/0179943 A1 | 7/2008 | Weber et al. |

(Continued)

FOREIGN PATENT DOCUMENTS

| JP | H03273989 | 12/1991 |
| JP | 2010 143508 A | 7/2010 |

(Continued)

OTHER PUBLICATIONS

Italian Search Report and Written Opinion in Italian Application No. 102018000010758, dated Jul. 26, 2019, with English translation.

(Continued)

*Primary Examiner* — Vinh Luong

(74) *Attorney, Agent, or Firm* — Volpe Koenig

(57) ABSTRACT

A control device of a bicycle hydraulic brake, comprising a cylinder, a tank, a piston slidably mounted in the cylinder to move between at least one first rest position in which the cylinder and the tank are in fluid communication and at least one second position in which the piston interrupts the fluid communication between the cylinder and the tank, a stop device that acts directly or indirectly on the piston. The cylinder and the tank are filled with hydraulic fluid and the stop device can take up a storage and transportation configuration in which it arranges the piston in said at least one second position.

11 Claims, 10 Drawing Sheets

(56) References Cited

U.S. PATENT DOCUMENTS

| | | | |
|---|---|---|---|
| 2008/0196402 A1* | 8/2008 | Kondou | B60T 8/3225 |
| | | | 60/562 |
| 2014/0368026 A1* | 12/2014 | Fushimi | B62L 3/08 |
| | | | 303/9.64 |
| 2016/0129966 A1* | 5/2016 | Meggiolan | B62K 23/02 |
| | | | 74/491 |
| 2016/0129968 A1* | 5/2016 | Meggiolan | B62L 3/023 |
| | | | 188/344 |
| 2020/0010142 A1* | 1/2020 | Thomas | B62L 1/005 |

FOREIGN PATENT DOCUMENTS

| | | | | |
|---|---|---|---|---|
| WO | WO 2008056379 A1 * | 5/2008 | | B62L 3/02 |
| WO | WO 2015152837 A1 * | 10/2015 | | B62K 23/06 |

OTHER PUBLICATIONS

English translation of European Office Action for Application No. 19 212 919.5 dated Jun. 24, 2021.

* cited by examiner

CONTROL DEVICE OF A HYDRAULIC BRAKE, BRAKING MEMBER AND HYDRAULIC BRAKING SYSTEM FOR A BICYCLE AND METHOD FOR STORING AND TRANSPORTING A HYDRAULIC BRAKING SYSTEM FOR A BICYCLE

CROSS REFERENCE TO RELATED APPLICATION

This application claims the benefit of Italian Application No. 102018000010758, filed on Dec. 3, 2018, which is incorporated herein by reference as if fully set forth.

FIELD OF INVENTION

The present invention relates to a control device of a hydraulic brake for a bicycle, to a braking member and to a hydraulic braking system for a bicycle. The present invention also relates to a method for storing and transporting a hydraulic braking system for a bicycle.

BACKGROUND

As known, it is now common in bicycles to use hydraulic braking systems, particularly for controlling disc brakes. Disc brakes are often preferred to conventional pad-type brakes because they can ensure a high braking power and are less subject to problems caused by mud or water.

Typically, a disc brake comprises a brake caliper fixed onto the frame of the bicycle or on the fork and a brake disc mounted on the hub of the wheel. Inside the brake caliper there are two opposite brake shoes, provided with two respective friction gaskets (also simply called pads). The brake disc rotates inside the space defined between the two brake shoes. By actuating the brake lever, the brake shoes are brought towards the brake disc, generating friction between the brake disc and the pads and, consequently, braking the wheel.

In the present description and in the following claims the expression "hydraulic braking system" will be used to indicate a system comprising a control device (including a brake lever), a braking member (including a brake caliper) and a flexible tube for supplying hydraulic fluid between the control device and the braking member.

In particular, the braking member comprises a hydraulic chamber and the control device comprises a piston sliding in a cylinder in liquid communication with a tank.

The hydraulic chamber and the cylinder are in fluid communication with each other through the flexible tube, so that by actuating the brake lever the liquid contained in the cylinder of the control device and consequently also the liquid contained in the hydraulic chamber of the braking member is acted on, so that the brake shoes are brought towards the brake disc.

Usually, a deformable membrane acts on the tank, said membrane having the task of transferring atmospheric pressure to the liquid inside the tank in order to ensure a suitable amount of braking liquid inside the cylinder also in the case of wearing of the pads (which causes an increase in volume of the hydraulic chamber).

Mounting the hydraulic braking system on the bicycle provides for an operator mounts the control device, the braking member and the flexible tube on the bicycle.

For this purpose it is known to store and transport the hydraulic braking system already assembled (namely with the flexible tube already associated with the control device and with the braking member), filled with hydraulic fluid and already tested.

In this way, the operator needs only to constrain the various components of the hydraulic braking system to the bicycle to make it operative.

In some mounting solutions, like for example when the flexible tube must be passed inside one or more tubes of the frame of the bicycle, a hydraulic braking system that is already assembled cannot be directly mounted on the bicycle.

In such mounting solutions, it is indeed necessary to disconnect the flexible tube from at least one among the braking member and the control device to be able to make the flexible tube follow the desired path and, only after, reconnect the flexible tube to the braking member and/or to the control device.

Such operations often have the drawback of requiring a top-up of hydraulic fluid after reassembly, a bleeding of the hydraulic braking system to expel the air that has entered into it and a recalibration of the hydraulic braking system.

In order to avoid such a drawback, it is known from document U.S. Pat. No. 9,227,692 to store and transport the hydraulic braking system with the control device, the braking member and the flexible tube disconnected from one another, each filled with hydraulic fluid and arranging fluid-tight closing caps and/or membranes on all of the liquid/air interfaces.

In particular, suitable fluid-tight closing membranes and suitable connectors are applied to the free ends of the flexible tube filled with hydraulic fluid.

Similarly, the control device and the braking member are filled with hydraulic fluid and equipped, at the respective connection portions to the flexible tube, with suitable connectors and fluid-tight closing membranes.

Once the flexible tube has been positioned, possibly making it pass inside one or more tubes of the bicycle frame, the flexible tube is connected to the control device and the braking member removing the sealing membranes and/or ensuring that the latter are perforated during the connection operations.

In this way, the hydraulic braking system is already filled with hydraulic fluid and does not need further operations to be made operative. Document U.S. Pat. No. 9,227,692 also teaches to lock the brake lever in rest position to prevent it from being able to be inadvertently actuated during the transportation or mounting of the hydraulic braking system. Indeed, the actuation of the brake lever would cause an immediate escape of hydraulic fluid from the control device or from the flexible tube (when the latter has already been connected to the control device in the mounting step).

SUMMARY

The Applicant has noted that the system described in document U.S. Pat. No. 9,227,692 is not without drawbacks.

Indeed, the length of the flexible tube is dictated by the type of bicycle on which the hydraulic braking system must be installed, by the size of the frame, and by the path that the flexible tube must follow.

Therefore, there is no single length of the flexible tube that can satisfy every installation requirement.

The Applicant has noted that a possible cutting to size in the installation step of a flexible tube already filled with hydraulic fluid, would cause an inevitable abundant escape of hydraulic fluid from the flexible tube itself.

This means that a very high number of flexible tubes of different lengths must be provided from which the operator must select at the ordering step of the hydraulic braking system that must be installed. This results in both the production and storage of a large number of flexible tubes of different lengths, and potential errors in the ordering and/or selection step by the operator.

The Applicant has also noted that on the sealing membrane applied on the control device, or on any other closing system, provided to close the connection portion to the flexible tube fluid-tight, the hydraulic fluid contained in the control device exerts a pressure created by the deformable membrane active on the tank that, as stated, transfers atmospheric pressure to the hydraulic fluid.

Therefore, in the removal step of the sealing membrane or when the sealing membrane is perforated to connect the flexible tube to the control device, it is possible for the hydraulic fluid to come out from the control device.

The Applicant has perceived that such a phenomenon also takes place in the presence of locking in rest position of the brake lever, since such locking avoids possible actuations of the piston inside the cylinder but does not prevent the deformable membrane from transferring a pressure to the liquid contained in the tank by means of the inevitable difference in height between the control and the braking member.

The present invention provides a bicycle hydraulic brake with a cylinder, a tank and a piston the slides within the cylinder. The piston moves between a rest position in which the cylinder and the tank are in fluid communication and a second position in which the piston interrupts the fluid communication between the cylinder and the tank. The cylinder and tank a filled with hydraulic fluid. A stop device acts on the piston so that the stop device can assume a storage and transportation configuration in which stop device locates the piston the second position.

BRIEF DESCRIPTION OF THE DRAWINGS

Further features and advantages of the invention will become clearer from the following description of a preferred embodiment, made with reference to the attached drawings. In such drawings.

DETAILED DESCRIPTION OF THE PREFERRED EMBODIMENTS

Figure 1:
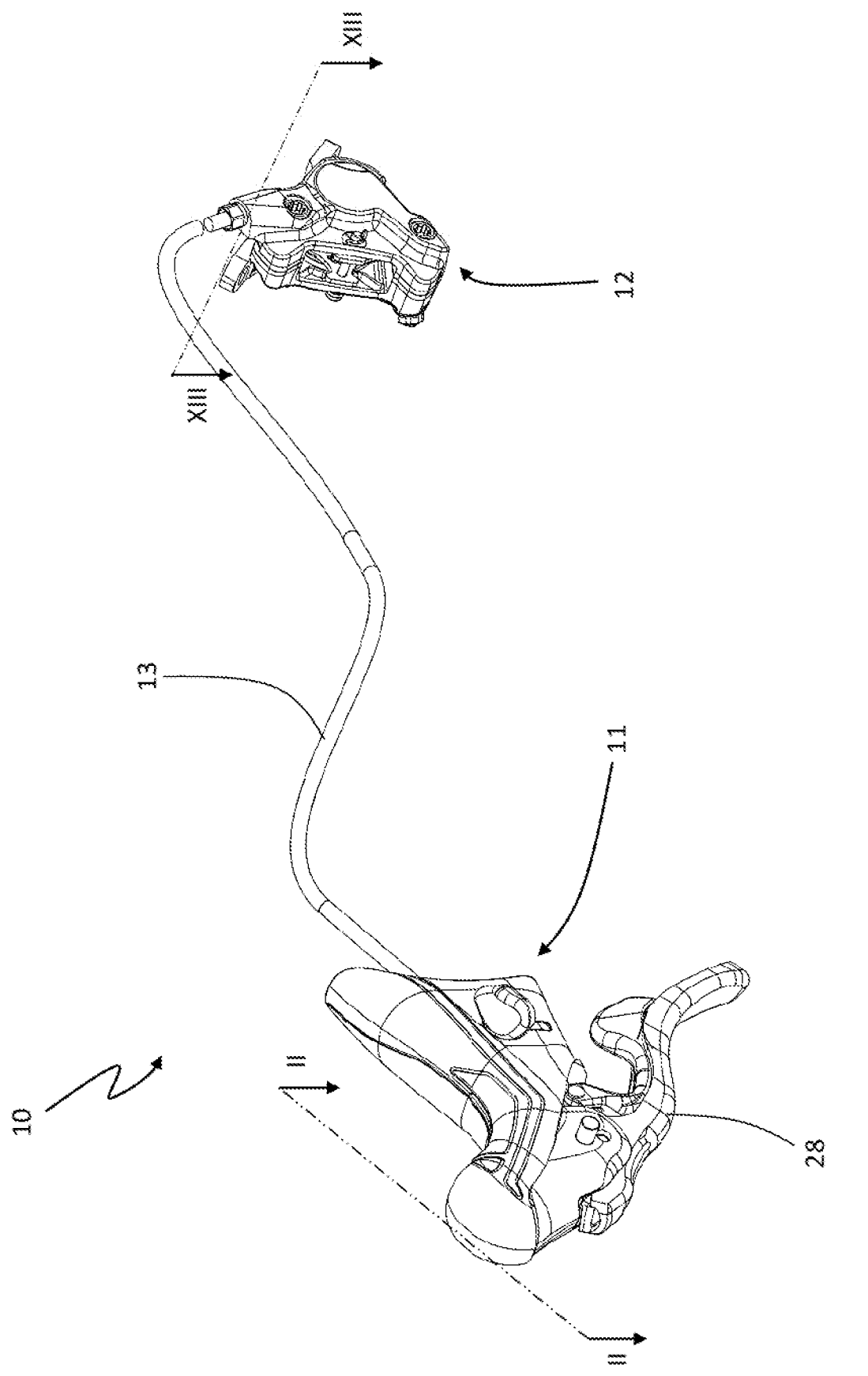
FIG. 1 is a perspective view of a hydraulic braking system in accordance with the present invention.

The present invention relates, in a first aspect, to a control device of a hydraulic brake for a bicycle comprising:
a cylinder;
a tank;
a piston slidably mounted in the cylinder to move between at least one first rest position in which the cylinder and the tank are in fluid communication and at least one second position in which the piston interrupts the fluid communication between the cylinder and the tank;
a stop device that acts directly or indirectly on the piston;
wherein the cylinder and the tank are filled with hydraulic fluid,
and wherein the stop device can assume a storage and transportation configuration in which it arranges the piston in said at least one second position.

When the piston is in the second position the tank is fluidically insulated from the cylinder.

Therefore, a pressure that acts on the hydraulic fluid contained in the tank, for example by means of an elastic membrane active on the tank or by means of a fluid communication with the outside, cannot be transmitted to the cylinder.

The Applicant has found that, once the piston has been brought into the second position and leaving, by means of the stop device, the piston in such a position, the hydraulic fluid does not tend to come out from the cylinder.

The control device can therefore be arranged for being handled, stored, transported, with the piston in the second position, without there being significant leaking of hydraulic fluid from the control device, thus without the tank or cylinder losing significant amounts of hydraulic fluid.

The Applicant has found that, in this way, the control device can be connected in advance to an end of a brake tube also filled with hydraulic fluid without there being leakages of fluid from the free end of the brake tube during storage and transportation, since the free end of the brake tube is in the same condition as the cylinder.

The Applicant has also found that also by cutting the brake tube there are no leakages of fluid from the new free end of the tube, since the new free end is in the same condition as the original free end.

This makes it possible to store and send control devices connected in advance to hydraulic tubes, filled with hydraulic fluid and with the piston arranged in the second position. The brake tube can be provided of a length such as to ensure the rougher mounting condition in terms of length of the brake tube, since the tube can be cut in the mounting step to the desired length without the tank or the cylinder or the tube itself losing hydraulic fluid.

The present invention relates, in a second aspect, to a braking member of a bicycle hydraulic brake comprising a hydraulic chamber connected to a hydraulic port and in fluid communication with at least one actuator, a pair of brake shoes, configured to couple with respective pads, on which the actuator is active; the two brake shoes being configured to switch between a rest position in which the two brake shoes are separated by a maximum distance and a plurality of active positions in each of which the brake shoes are separated by respective second distances each smaller than the maximum distance; wherein the hydraulic chamber and the actuator are filled with hydraulic fluid and wherein the brake shoes are in a storage and transportation position coinciding with a position of the plurality of active positions.

The braking member is therefore in a condition of slight approach together of the brake shoes, preferably so as to still allow the insertion of the brake disc. The Applicant has noted that even in this condition there is no leaking of fluid from the hydraulic port towards the outside and, therefore, the hydraulic member can be stored and transported already filled with hydraulic fluid to subsequently be mounted on the bicycle.

The present invention relates, in a third aspect, to a bicycle hydraulic braking system comprising a control device according to the first aspect of the present invention and a braking member according to the second aspect of the present invention, wherein the control device is connected to a first piece of brake tube filled with hydraulic fluid and sealed at a free end thereof; the braking member not being hydraulically connected to the piece of brake tube.

Such a system can be stored and transported without there being leaks of fluid from the first piece of brake tube or from the hydraulic port of the braking member.

Such a braking system can be obtained in accordance with a fourth aspect of the present invention that relates to a method for storing and transporting a bicycle hydraulic braking system comprising:

providing a control device of a hydraulic brake comprising:
- a cylinder;
- a tank;
- a piston slidably mounted in the cylinder to move between at least one first rest position in which the cylinder and the tank are in fluid communication and at least one second position in which the piston interrupts the fluid communication between the cylinder and the tank;
- providing a braking member comprising:
- a hydraulic chamber having a hydraulic port;
- at least one actuator active on at least one of a pair of brake shoes configured to couple with a respective pad;
- connecting a brake tube to an outlet opening of the control device and to the hydraulic port of the braking member;
- filling the control device, the brake tube and the braking member with hydraulic fluid;
- actuating the piston of the control device in a storage and transportation position coinciding with the second position
- locking the piston so that it does not reach the first rest position;
- cutting the brake tube in a section comprised between the control device and the braking member or disconnecting the brake tube from the hydraulic port of the braking member or from the outlet opening of the control device.

By actuating the piston in the second position when the control device is connected to the braking member through the brake tube, the hydraulic fluid is pushed from the cylinder to the hydraulic chamber of the braking member causing the brake shoes to move towards one another.

The movement of the brake shoes towards one another, when the braking member is not mounted in operative position on the bicycle, is not counteracted (as on the other hand occurs when the brake shoes press the pads against the brake disc or against the rim of the wheel), therefore the pressure inside the braking system does not increase.

As stated above in relation to the first and to the second aspect of the present invention, by cutting the brake tube (or disconnecting it from the braking member or from the control device) there is no leaking of fluid from the free end of the brake tube, from the hydraulic port of the braking member or from the control device.

The hydraulic braking system can thus be stored and transported while filled with fluid without fluid losses.

It should be noted that the cutting of the brake tube does not result in the need to recalibrate the hydraulic braking system once mounted on the bicycle. Indeed, the hydraulic braking system, once calibrated before the actuation of the piston in the second position, remains calibrated since it is not subject to losses of hydraulic fluid during storage, transportation and mounting.

Concerning this, in accordance with a fifth aspect, the present invention relates to a method for assembling a bicycle hydraulic braking system comprising:

providing a hydraulic braking system according to the third aspect of the present invention and placing the stop device in storage and transportation configuration,
installing the control device on bicycle handlebars,
directing the brake tube connected to the control device towards the braking member along a predetermined path,
cutting to size a free end of the brake tube so that it reaches the braking member at a predetermined size, constraining the free end of the brake tube in a fluid-tight manner to the braking member,
installing the braking member on a predetermined portion of bicycle frame.

The operations defined above can be easily carried out, in light of what has been stated above, without there being leaks of fluid from the free end of the brake tube or from the hydraulic port of the braking member.

Therefore, the mounting of the hydraulic braking system on the bicycle can be carried out without having to calibrate the system itself. It should be noted that even by cutting the brake tube to the desired length there is no need to recalibrate the system, since the hydraulic fluid contained in the portion of tube that is cut and discarded is not necessary for the operation of the hydraulic braking system.

The present invention, in at least one of the aforementioned aspects, can comprise at least one of the preferred features described hereinafter.

Preferably, the stop device, when in the storage and transportation configuration, blocks any movement of the piston.

Preferably, a seat is provided for the stop device, the storage and transportation configuration corresponding to the insertion of the stop device inside the seat and the stop device being removable from the seat.

Preferably, a return mechanism of the piston is provided exerting a force on the piston tending to push the piston towards the first rest position when the stop device is not in the storage and transportation configuration.

Preferably, the return mechanism of the piston comprises a spring provided between the cylinder and the piston configured to push the piston towards the first rest position.

The spring has the function of bringing the piston into the first rest position during the normal operation of the control device following a braking action proposed by the cyclist.

In the storage and transportation configuration of the stop device, the piston is in the second position and the spring exerts a thrust on the piston directed towards the first rest position of the piston; such a thrust being counteracted by the stop device.

Preferably, a flexible membrane configured to transfer atmospheric pressure to the hydraulic fluid contained in the tank acts on the tank.

Preferably, the cylinder comprises an inlet opening for the hydraulic fluid and an outlet opening for the hydraulic fluid and the tank comprises an outlet opening; the outlet opening of the tank being in fluid communication with the inlet opening of the cylinder.

In the first rest position of the piston the inlet opening and the outlet opening of the cylinder are in fluid communication, whereas in the second position the piston interrupts the fluid communication between the inlet opening and the outlet opening of the cylinder.

Preferably, the piston comprises a hydraulic gasket configured to contact an inner wall of the cylinder and make a fluid-tight seal between the piston and the inner wall of the cylinder.

The hydraulic gasket slides across the inner surface of the cylinder during the movement of the piston, dividing the hydraulic chamber into two fluidically separate portions.

Preferably, the hydraulic gasket with the piston in the second position is provided between the inlet opening and the outlet opening of the cylinder.

In this way, when the piston is in the second position the hydraulic gasket prevents hydraulic fluid present in the tank from reaching the outlet opening of the cylinder.

Preferably, there is provided a housing body for the cylinder and the piston and a brake lever, active on the piston, hinged to the housing body and configured to rotate along a first angular direction and a second angular direction opposite to the first. The brake lever rotates in the first angular direction between a rest position in which the piston is in the first rest position and at least one active position in which the piston is in the second position. The brake lever rotates in the second angular direction between the active positions and the rest position. Each angular position taken up by the brake lever corresponds to a position of the piston.

During normal operation, a rotation imparted by the cyclist on the brake lever along the first angular direction causes braking.

Preferably, the brake lever does not set the piston in motion from any second position towards the first rest position. In other words, the rotation of the brake lever along the second angular direction does not act directly on the motion of the piston. The piston moves from one of the second positions towards the first rest position at least partially by means of the aforementioned spring active between the piston and the cylinder.

The motion of the piston by means of the thrust exerted by the spring and of possible other members of the return mechanism sets the brake lever in rotation along the second angular direction. In this way, the brake lever goes back into the rest position without the need for an intervention by the cyclist (who on the other hand must intervene to move the brake lever along the second angular direction).

Preferably, when the stop device is in the storage and transportation configuration the stop device is active on the brake lever to keep it in the at least one active position.

Preferably, the stop device is active on the brake lever to prevent the rotation thereof at least along the second angular direction, namely the angular direction that brings the brake lever into the rest position.

Indeed, it should be noted that, due to what has been stated above, the brake lever does not rotate in the first angular direction without an external intervention (for example of the cyclist), whereas it can freely rotate in the second angular direction by means of the return mechanism. By preventing the brake lever, when in the active position, from rotating in the second angular direction, any spontaneous movement of the piston from the second position is prevented.

Preferably, the stop device is active on the brake lever to prevent any rotation thereof.

In this way, the brake lever cannot rotate in the first angular direction even after an external intervention, ensuring that the piston remains in the second position even after an involuntary attempted actuation of the brake lever.

Preferably, the stop device comprises a pin inserted in a seat of the housing body, the pin interfering with the rotation of the brake lever and preventing the rotation of the brake lever at least along the first angular direction.

Preferably, the pin interferes with the brake lever and prevents any rotation of the brake lever.

Preferably, an end stop adjustment device of the piston is provided.

Preferably, the end stop adjustment device of the piston is configured to define at least two stable rest positions of the piston inside the cylinder, the end stop adjustment device being configured to switch between at least one first condition corresponding to a first rest position of the piston and a second condition corresponding to a second rest position of the piston.

In this way, the stroke, namely the excursion of the piston before the braking is activated, can be adjusted and selected by the cyclist.

Indeed, it should be noted that during normal use, the piston transmits a force to the brake shoes of the braking member when the piston reaches a second position, namely when the piston interrupts the fluid communication between tank and cylinder.

In order to reach such a position starting from the rest position, the piston carries out a stroke, even if short.

The end stop adjustment device of the piston acts on such a stroke, increasing or decreasing it.

Alternatively or in combination with the aforementioned pin, the stop device can be made from the end stop adjustment device switched in a storage and transportation condition.

In particular, preferably the end stop adjustment device is configured to be switched into a third condition in which the piston interrupts the fluid communication between the cylinder and the tank; the stop device being made from the end stop adjustment device and the storage and transportation configuration corresponding to said third position.

Preferably, the end stop adjustment device is provided inside a seat in the housing body and comprises an actuation interface facing the outside of the housing body.

The actuation interface can be a hexagonal recess or similar that faces the seat in the housing body and that can be engaged by a suitable tool. By acting on the hexagonal recess, it is possible to switch the end stop adjustment device into the various aforementioned conditions.

Preferably, such a hexagonal recess can be engaged by the aforementioned pin to constrain the latter in position.

Preferably, the outlet opening of the cylinder is in fluid communication with a hydraulic port to which a brake tube is connected, said brake tube being configured to connect the control device with a braking member; the brake tube being filled with brake fluid.

Preferably, the braking member comprises a piece of brake tube connected to the hydraulic port and filled with hydraulic fluid.

Such a piece of brake tube makes one of the two half-parts of brake tube after the brake tube has been cut following the actuation of the piston in the second position. The other half-part of brake tube is connected to the control device.

Preferably, actuating the piston in the storage and transportation position comprises switching the two brake shoes into a storage and transportation position in which the brake shoes are brought towards one another.

This operation is carried out before the brake tube is cut and with the braking member that is not shown in operative position on the bicycle.

Preferably, actuating the piston of the control device in a storage and transportation position comprises rotating a brake lever of the control device along a first angular direction.

The rotation of the brake lever in the first angular direction is actuated until the piston reaches the storage and transportation position.

Preferably, locking the piston so that it does not reach the first rest position comprises providing a stop device active on the control device that prevents the movement of the piston.

Preferably, providing a stop device comprises inserting a pin in a seat of a housing body of the control device so that the pin mechanically interferes with the control lever in the position corresponding to the storage and transportation position of the piston.

As stated, in this way the piston is prevented from sliding in the cylinder towards the rest position since it is counteracted in such a movement by the brake lever that is prevented from rotating in the second angular direction.

The insertion of the pin in the seat of the housing body is carried out with the brake lever rotated in the first angular direction and the piston in the storage and transportation position.

Alternatively or in combination, actuating the piston of the control device in a storage and transportation position comprises providing an end stop adjustment device of the piston, configured to define at least two stable rest positions of the piston inside the cylinder, configured to be switched in a third condition corresponding to the storage and transportation position of the piston.

Preferably, in the case in which the end stop adjustment device of the piston is an alternative to the aforementioned pin, the switching of the end stop device in the storage and transportation condition can be carried out with a brake lever in a rest condition.

Preferably, after the cutting of the brake tube it is provided for to remove a portion of brake tube connected with the braking member.

The portion of brake tube connected with the control device is not disconnected from the control device.

Preferably, after the cutting of the brake tube it is provided for to insert a closing cap provided with a hooking device on the free end of the brake tube.

Preferably, after having removed the portion of brake tube connected with the braking member, it is provided for to remove constraining members between the brake tube and the braking member and associate new constraining members intended to receive and hold a brake tube with the braking member.

Such new constraining members make it possible to connect the portion of tube connected to the control device to the braking member when the installation of the braking system on the bicycle is carried out.

In particular, after the fluid-tight connection of the free end of the brake tube to the braking member (previously cut or disconnected from the braking member), it is provided for to remove the stop device from the control device.

By permanently removing the stop device only after the braking member has been reconnected to the control device the fluid communication between tank and cylinder is restored with the system closed, namely with the system making a closed hydraulic circuit.

Preferably, it is provided for to move apart the brake shoes of the braking member and bring them into the rest position after having constrained the free end of the brake tube in a fluid-tight manner to the braking member.

The brake shoes had moved towards one another when the piston had been actuated into the storage and transportation position. In order to allow the brake caliper to receive the brake disc or the rim of the wheel it is necessary to move apart the brake shoes again to create the necessary space between them. Such an operation is carried out in the mounting step of the braking system with the braking member already reconnected to the control device, namely when a closed hydraulic circuit has been restored.

The brake fluid that from the braking member flows back towards the control device (after the brake shoes have moved apart) can thus reach the tank and accumulate there.

With reference now to FIG. 1, reference numeral 10 wholly indicated a hydraulic braking system for a preferably high-performance bicycle.

The system 10 is intended to be mounted on a bicycle in the way described hereinafter.

The system 10 comprises a control device 11 of a hydraulic brake designed to be mounted on bicycle handlebars, a braking member 12 that is also hydraulically actuated and designed to be mounted on a frame portion or on a fork portion of the bicycle and a brake tube 13 configured to fluidically connect the control device 11 with the braking member 12.

Figure 2:
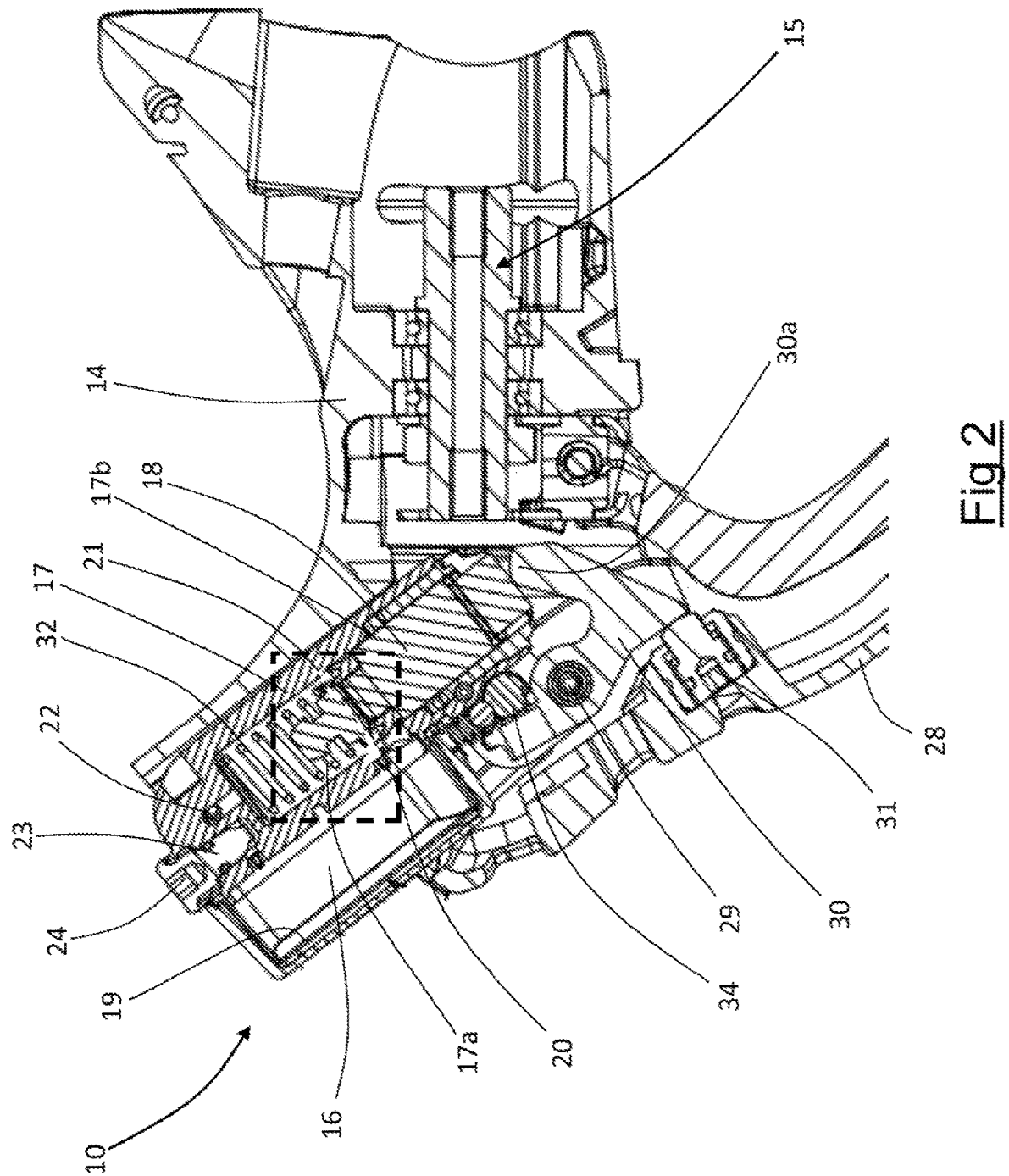
FIG. 2 is a section view along the plane II-II of a control device of a brake illustrated in FIG. 1 in a first configuration.
Figure 3:
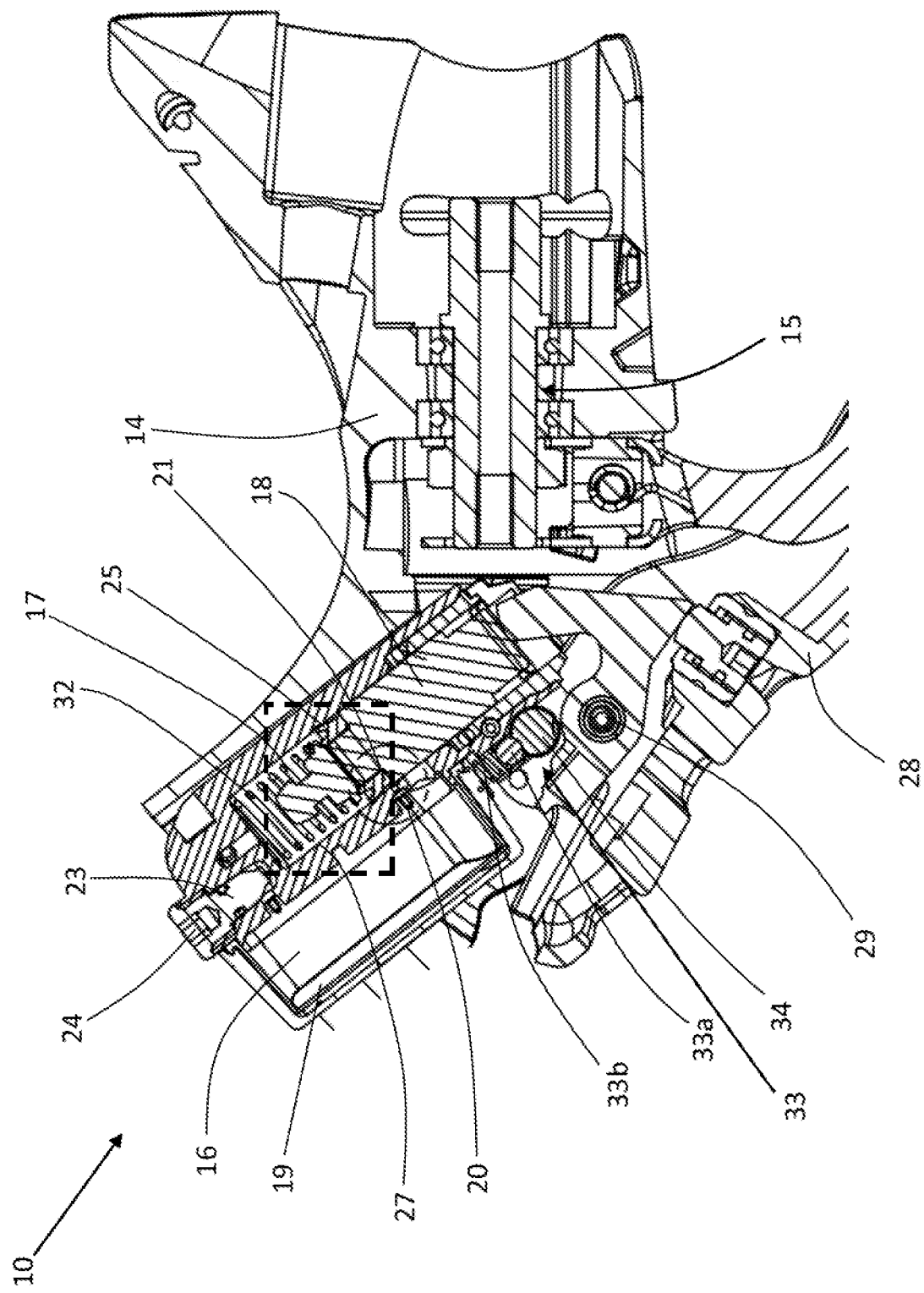
FIG. 3 is the control device of a brake illustrated in FIG. 2 in a second configuration.

With particular reference to FIGS. 2 and 3, the control device 11 comprises a housing body 14 configured to contain the hydraulic components of the control device.

The housing body 14 can also contain an actuation device of the gearshift of the bicycle generically indicated with reference numeral 15 and not described any further since it is of the per se known type.

Inside the housing body 14 there is a tank 16 for a hydraulic fluid and a cylinder 17 inside which a piston 18 is slidably mounted.

The hydraulic fluid is preferably a liquid and in particular oil.

In the example embodiment illustrated in FIGS. 2 and 3, the tank 16 is at least partially surrounded by an elastic membrane 19 which has the function of transmitting atmospheric pressure to the hydraulic fluid present in the tank 16. The elastic membrane 19 insulates the inside of the tank 16 in a fluid-tight manner from the outside.

Figure 4:
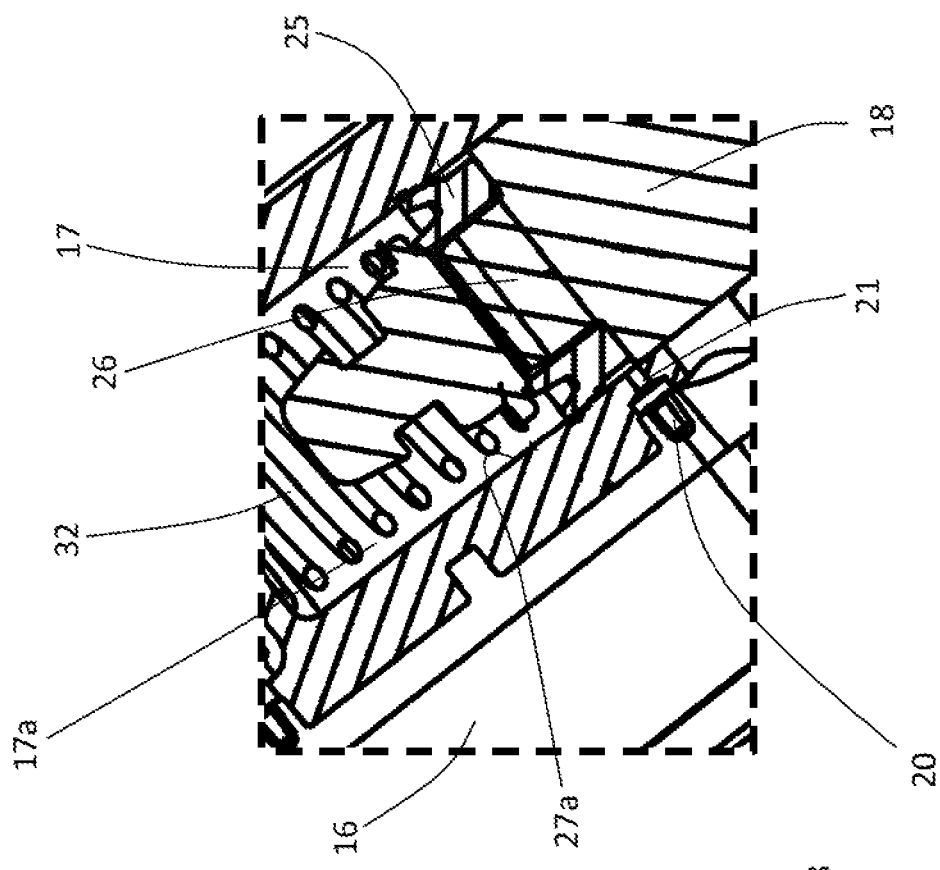
FIGS. 4 and 5 are enlargements of some details of the control device of a brake of FIGS. 3 and 4, respectively.
Figure 5:
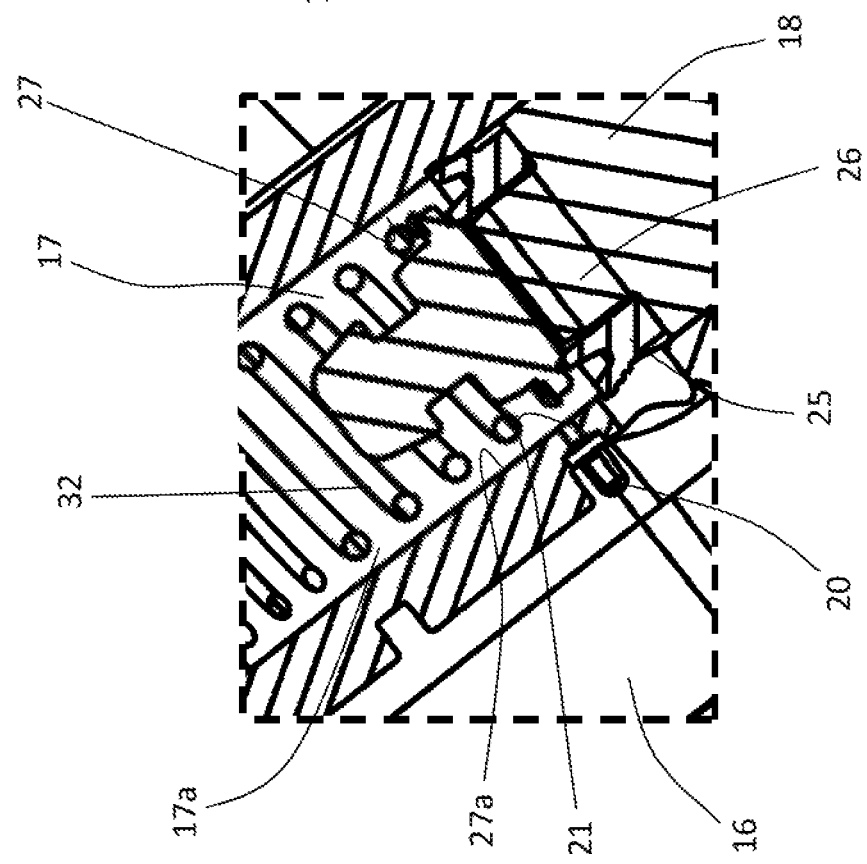

The tank 16 comprises an outlet opening 20, better illustrated in the enlargements of FIGS. 4 and 5, to allow the hydraulic fluid to reach the cylinder 17.

Concerning this, the cylinder 17 comprises an inlet opening 21 (also better illustrated in FIGS. 4 and 5) placed in fluid communication with the outlet opening 20 of the tank 16.

The cylinder 17 also comprises an outlet opening 22 configured to be directly connected, or through a connection channel, with the brake tube 13.

The tank 16 is equipped with an inlet opening 23, closed by a removable closing element 24, to allow the loading/bleeding of hydraulic fluid inside the tank 16.

As stated, the piston 18 is slidably mounted inside the cylinder 17 so as to be mobile between at least one first rest condition and a plurality of second positions.

In the first rest position of the piston 18 (illustrated in FIG. 2), the inlet opening 21 and the outlet opening 22 of the cylinder 17 are in fluid communication, namely the hydraulic fluid present in the tank 16 can reach the outlet opening 22 of the cylinder 17.

In the second positions of the piston 18 (one of which is shown in FIG. 3), the inlet opening 21 and the outlet opening 22 of the cylinder 17 are not in fluid communication, namely the hydraulic fluid present in the tank 16 cannot reach the outlet opening 22 of the cylinder 17.

Concerning this, the piston 18 comprises a hydraulic gasket 25 (better illustrated in FIGS. 4 and 5) constrained to the piston itself close to a head 26 of the piston 18 and operatively active between the piston 18 and an inner wall 27 of the cylinder 17.

The hydraulic gasket 25 prevents hydraulic fluid present in the cylinder 17 from leaking between the inner wall 27 of the cylinder 17 and the piston 18. The hydraulic gasket 25 divides the hydraulic chamber 17 into two fluidically separate portions. In particular, the hydraulic gasket 25 divides an upper portion 17a of the cylinder 17 from a lower portion 17b of the cylinder 17. The lower portion 17b of the cylinder 17 is occupied by the piston 18 and the upper portion 17a of the cylinder 17 is filled with hydraulic fluid.

The hydraulic gasket 25 therefore ensures that the piston 18 can transfer a pressure to the hydraulic fluid present in the cylinder 17 to direct it towards the outlet opening 22 of the latter.

When the piston 18 is in a second position, the hydraulic gasket 25 is positioned between the inlet opening 21 and the outlet opening 22 of the cylinder 17, thus interrupting the fluid communication between inlet opening 21 and outlet opening 22.

For this purpose, the inlet opening 21 of the cylinder 17 is provided on a side surface 27a of the inner wall 27 of the cylinder 17, so as to be intercepted by the hydraulic gasket 25 during the movement of the piston 18.

As better illustrated in FIG. 4, when the piston 18 is in the first rest position the hydraulic gasket 25 is beneath the inlet opening 21, namely it is further from the outlet opening 22 with respect to the inlet opening 21.

As illustrated in FIG. 5, when the piston 18 is in the second position the hydraulic gasket 25 is above the inlet opening 21, namely it is closer to the outlet opening 22 with respect to the inlet opening 21, fluidically insulating the inlet opening 21 from the outlet opening 22.

During the normal use of the bicycle, namely when the hydraulic braking system 10 is mounted on the bicycle and is operative, the actuation of the piston 18 between the first rest position and one of the second positions takes place by acting on a brake lever 28 of the control device 11.

Figure 6:
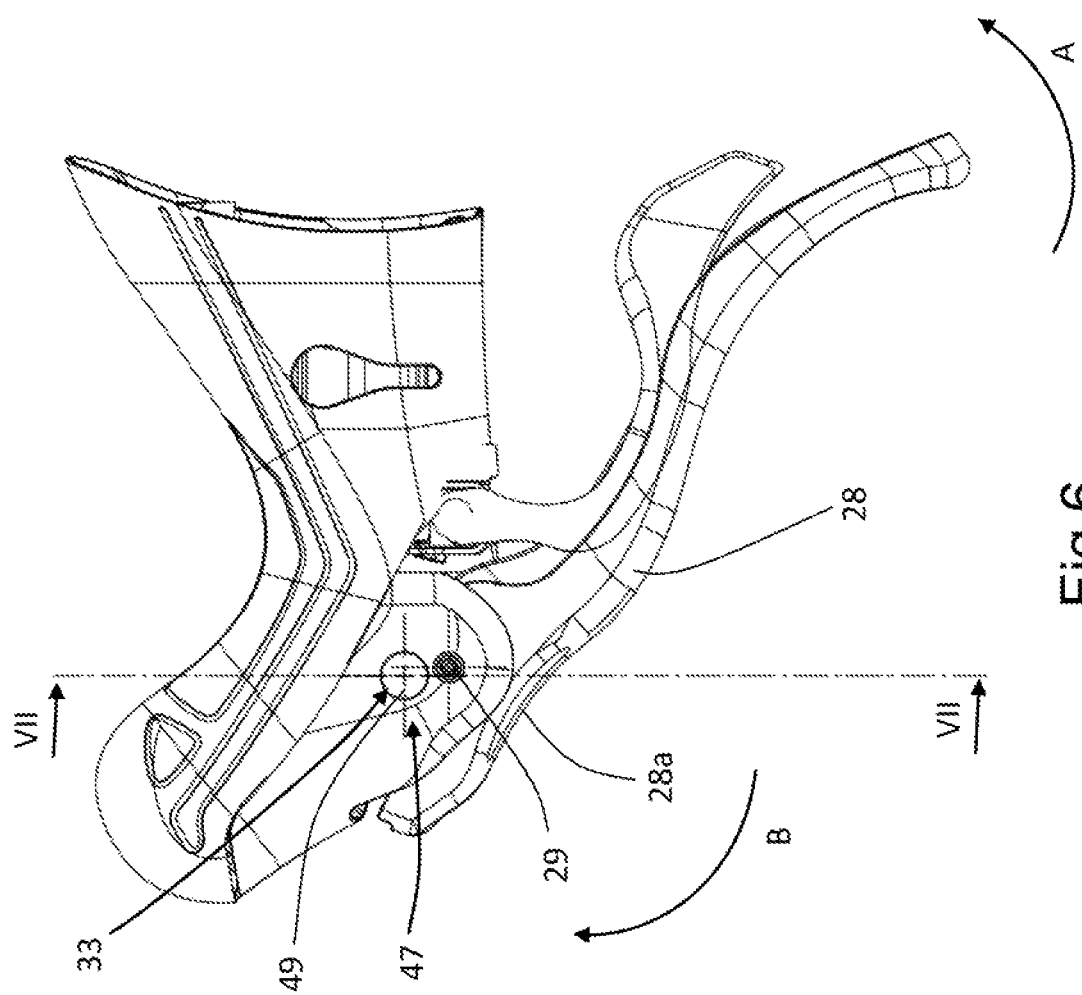
FIG. 6 is a side view of the control device of a brake illustrated in FIG. 1.

The brake lever 28 is hinged onto the housing body 14 close to an end 28a of the brake lever 28 itself through a pin 29 (FIG. 6). The brake lever 28 is rotatable along a first angular direction A from a rest position towards a plurality of active positions and along a second angular direction B, opposite the first A, from one of the active positions towards the rest position.

The brake lever 28 acts on a linkage to push the piston 18 towards the second positions when the brake lever 28 is rotated along the first angular direction A.

The linkage comprises, in the preferred embodiment of the invention, a hammer 30 hinged to the housing body 14 through the same hinge pin 29 of the brake lever 28. As shown in FIGS. 2 and 3, a free end 30a of the hammer 30 is in contact with the piston 18, so that a rotation of the hammer 30 in the first angular direction A causes a thrust on the piston 18.

The brake lever 28 contacts the hammer 30 in a position thereof comprised between the pin 29 and the free end 30a, so that a rotation in the first angular direction A imparted by the cyclist at the brake lever 28 corresponds to a rotation in the same angular direction of the hammer 30.

At the contact point of the brake lever 28 with the hammer 30 an adjustment pawl 31 is provided (FIG. 2) which makes it possible to bring the brake lever 28 towards or away from the hammer 30 to define different distances of the brake lever 28 from the housing body 14.

In order to bring the piston 18 back towards the rest position, a return mechanism is provided, which comprises a spring 32 active between the piston 18 and the cylinder 17. The spring 32 tends to push the piston 18 away from the outlet opening 22 of the cylinder 17.

The spring 32 therefore tends to push the free end 30a of the hammer 30 through the piston 18 and to make it rotate in the second angular direction B. Such a rotation causes an analogous rotation in the same angular direction of the brake lever 28.

Therefore, the piston 18 and with it the brake lever 28 go back into the rest position as soon as the force necessary to make the brake lever 28 in the first angular direction A has stopped, namely as soon as the cyclist releases the brake lever 28.

Figure 11:
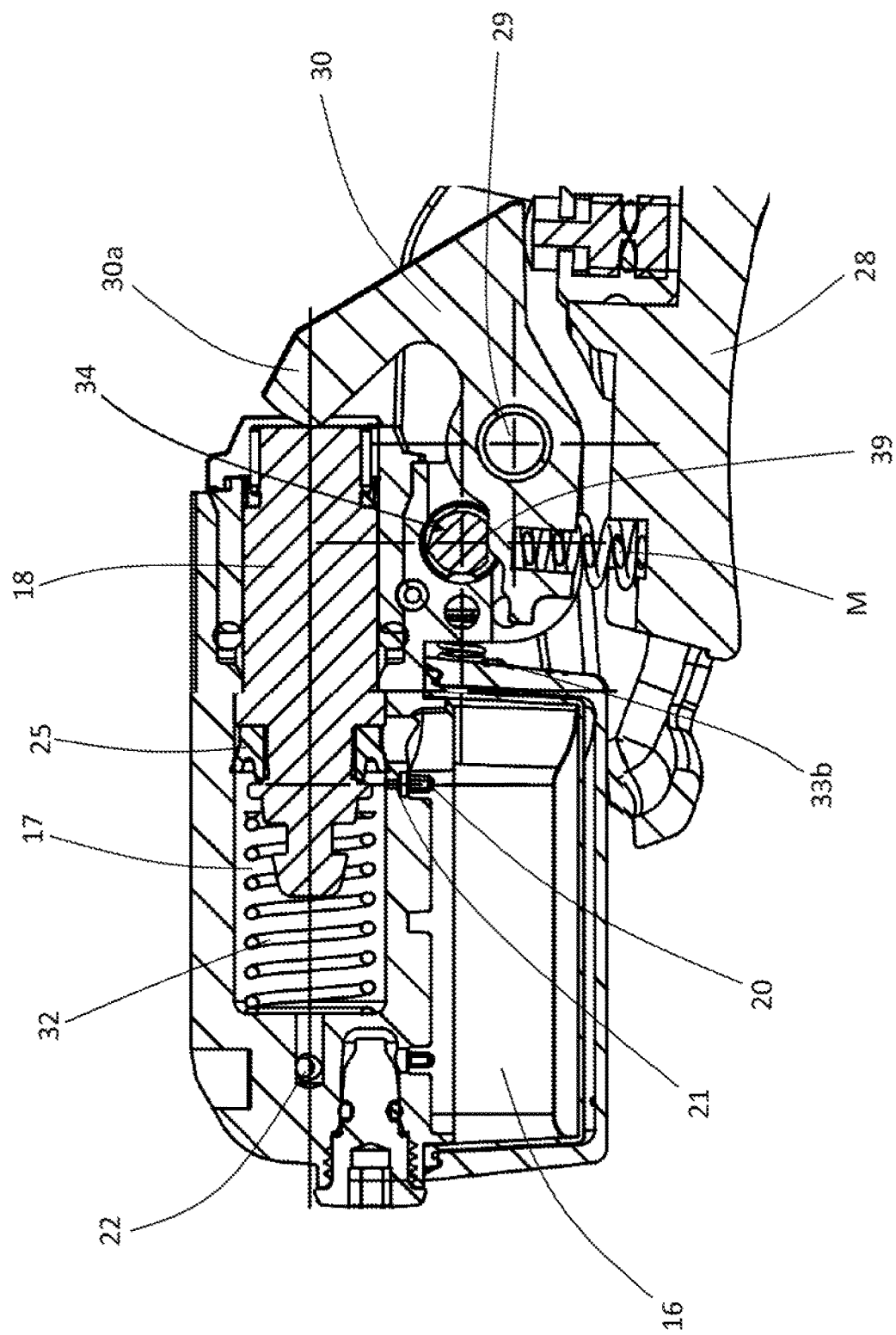
FIGS. 11 and 12 are enlarged views of parts of the control device of a brake with the detail of FIG. 10 in two different configurations.

The control device 11 can also be equipped with an end stop adjustment device 33 configured to adjust the rest position of the piston 18 (FIG. 11). The end stop adjustment device 33 moves the piston 18 towards the inlet opening 21 of the cylinder and keeps it in position, therefore making the stroke that the piston 18 must carry out before the gasket 25 goes past the inlet opening 21 adjustable.

Figure 10:
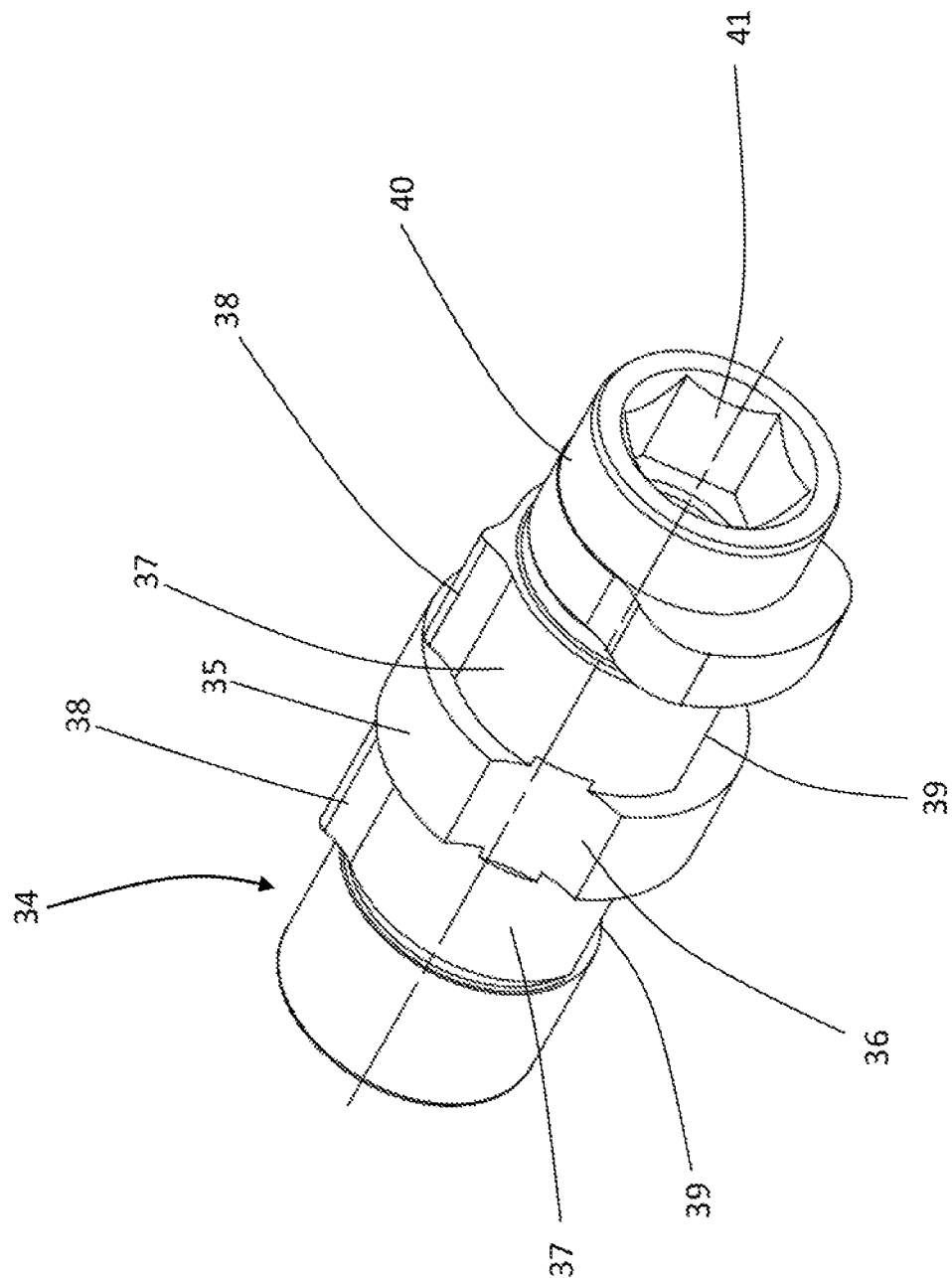
FIG. 10 is a perspective view of a particular control device of a brake illustrated in FIGS. 2 and 3.

As illustrated in FIG. 10, the end stop adjustment device 33 comprises a cam-type pin 34.

The cam-type pin 34 cooperates with the hammer 30 and is rotatable into a predetermined number of positions in which the hammer 30 changes the rest position of the piston 18 in the cylinder 17.

In particular, the cam-type pin 34 comprises a first cam 35 equipped with two recesses 36 (only one of which is visible in FIG. 10) angularly spaced apart preferably by about 150°. The cam-type pin 34 also comprises at least one second cam 37 (preferably a pair of second cams 37 as illustrated in FIG. 10) equipped with a projection 38. Circumferentially spaced from the projection 38, the second cam 37 comprises a flat portion 39. The end stop adjustment device 33 is also equipped with an end 40 equipped with an interface 41 configured to be engaged by a spanner or wrench. The interface 41 can for example be shaped like a prismatic recess (with six faces like in the illustrated example) or other shape suitable for engagement with a suitable maneuvering key.

The cam-type pin 34 is rotatably mounted on the housing body 14 parallel to the hinge pin 29 of the brake lever 28.

The end stop adjustment device 33 also comprises a slider 33a abutted by an elastic member 33b (visible in FIGS. 2 and 3) active on the cam-type pin 34.

In particular, the slider 33a, preferably cylindrical in shape, is configured to selectively engage each of the two recesses 36 of the first cam 35, so as to lock the cam-type pin 34 in position.

As shown in FIG. 11, when the slider 33a engages a first recess 36, the cam-type pin 34 is oriented so that the flat portion 39 of the second cam 37 contacts the hammer 30. The hammer 30 is pushed towards the cam-type pin 34 by a spring M so as to ensure that the hammer remains in contact with the cam-type pin 34 and with the flat portion 39 of the second cam 37.

This determines a precise angular position of the hammer 30 when the piston 18 is in the first rest condition.

By rotating the cam-type pin 34 so that the other recess 36 is engaged stably by the slider 33a, the cam-type pin 34 contacts the hammer 30 along its own cylindrical surface. This causes a rotation of the hammer 30 that determines a different angular position thereof and the reaching of a second rest position of the piston 18.

In particular, since the cylindrical portion of the cam-type pin 34 that contacts the hammer 30 is radially outer than the flat portion 39 with respect to a center of rotation of the cam-type pin 34, the stable angular position reached by the hammer 30 is such as to bring the piston 18 further towards the inlet opening 21 of the cylinder 17.

The selection among the two rest positions of the hammer 30 is carried out by acting on the interface 41 of the cam-type pin 34 through a suitable maneuvering key.

Figure 13:
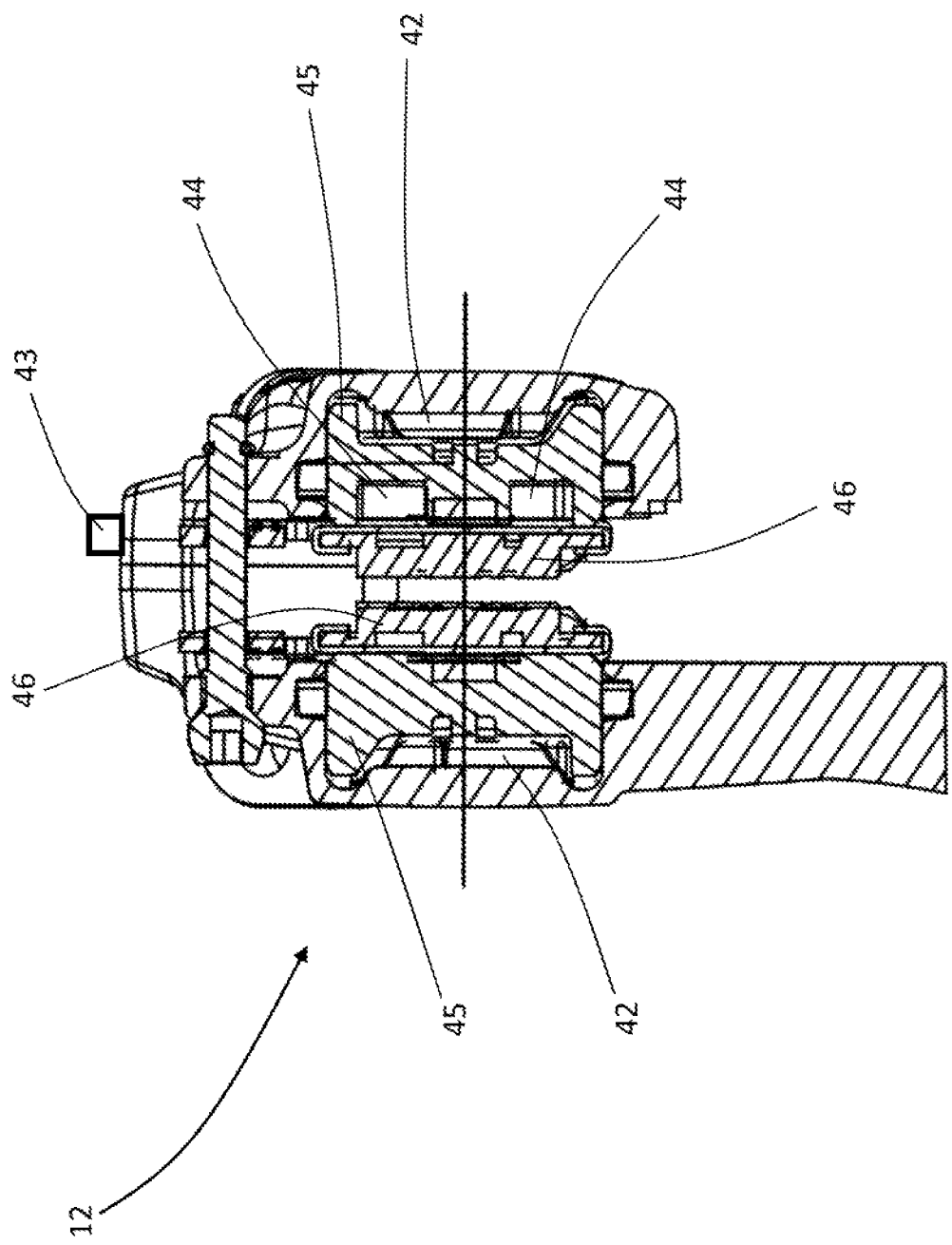
FIG. 13 is a section view along the plane XIII-XIII of a braking member of FIG. 1.

The braking member 12, better illustrated in FIG. 13, of the system 10 comprises a hydraulic chamber 42 in permanent fluid communication with a hydraulic port 43 configured to be connected to the brake tube 13. The hydraulic fluid enters and exits the hydraulic chamber 42 through the hydraulic port 43.

The connection between the brake tube 13 and the hydraulic port 43 can for example be carried out, in a per se known way, using a deformable body (known in the jargon with the term "olive"), a coupling terminal and a clamping screw. The deformable body has the function of mechanically holding the coupling terminal in the hydraulic port 43 and of ensuring the hydraulic seal between the brake tube and the hydraulic port 43.

The braking member 12 also comprises at least one actuator 44, preferably two actuators 44, made from a piston placed in fluid communication with the hydraulic chamber 42. The piston is active on a jaw 45 on which a pad 46 is placed, which has the function of contacting a brake disc or the rim of the bicycle wheel during braking.

A further jaw 45 is provided, opposite the jaw 45 actuated by the actuator 44, also equipped with a pad 46.

When the braking system 10 is mounted on the bicycle, the actuation of the brake lever 28 by the cyclist puts the hydraulic fluid under pressure in the cylinder 17 and such a pressure is transmitted, through the brake tube 13 to the hydraulic chamber 42. The actuator 44 actuates the brake shoes 45 towards one another, causing braking.

In particular, the brake shoes 45 can be switched between a rest position in which the two brake shoes 45 are moved apart by a maximum distance such as not to allow a braking action and a plurality of active positions in each of which the brake shoes 45 are separated by respective second distances, smaller than the maximum distance.

In order to allow the storage and transportation of the braking system 10 and the subsequent mounting on the bicycle without having to recalibrate the entire braking system 10, the braking system 10 is firstly completely assembled without however being mounted on the bicycle.

In other words, the control device 11 is connected to the brake tube 13 and the brake tube 13 is also connected to the braking member 12.

The braking system 10 is then filled with hydraulic fluid for correct operation.

Thereafter, the cylinder 17 and the tank 16 are decoupled, in particular the piston 18 is actuated to bring it into a storage and rest position that coincides with one of the second positions. This actuation of the piston 18 causes the brake shoes 45 of the braking member 12 to come towards one another, reaching a storage and transportation position coinciding with one of the active positions.

The actuation of the piston 18 in the storage and transportation position can be carried out by rotating the brake lever 28 in the first angular direction A or by acting on the end stop adjustment device 33 (the latter possibility will be described hereinafter). In any case, the actuation of the piston 18 in the storage and transportation position requires the intervention of an operator.

The hydraulic fluid inside the braking system 10 is, in this configuration, in an equilibrium condition.

More in general, a system that interrupts the fluid communication between tank 16 and cylinder 17 and that is capable of blocking a movement of the brake lever 28 (or of the piston 18) can be used to separate the tank 16 from the oil/air interface that is created at the disconnection of the brake tube 13 or at the cutting thereof in storage and transportation condition.

In the described case, the piston 18, in the storage and transportation position, is prevented from going back into the rest position.

Concerning this, a stop device 47 is provided that acts directly or indirectly on the piston 18.

Figure 7:
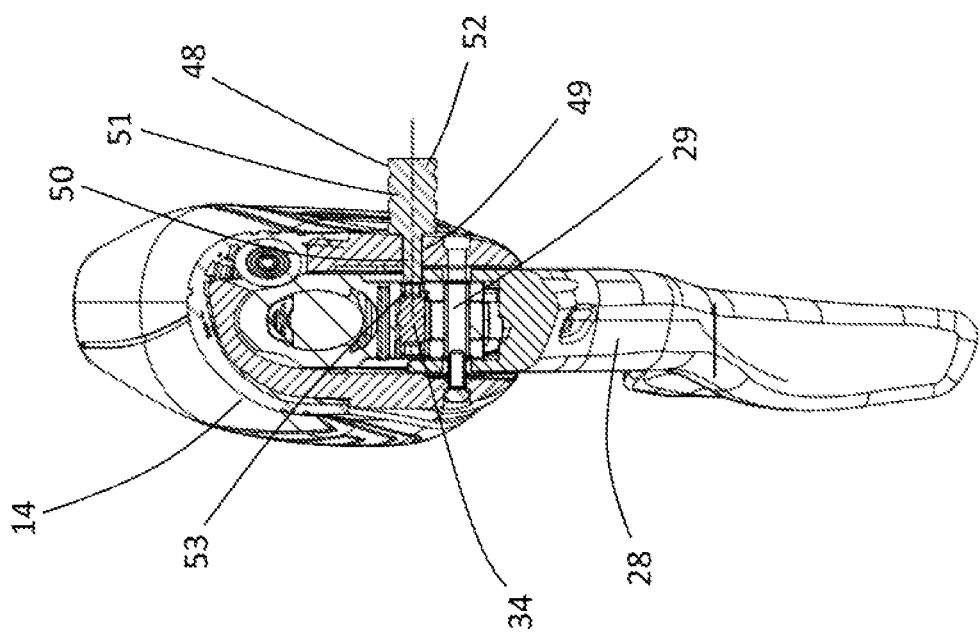
FIG. 7 is a section view along the plane VII-VII of a control device of a brake illustrated in FIG. 1.

The stop device 47, in a first embodiment illustrated in FIGS. 6 and 7 comprises a pin 48 that acts on the brake lever 28 to prevent it from rotating in the second angular direction B towards the rest position. This configuration of the stop device 47 is particularly preferred when the actuation of the piston 18 takes place by rotating the brake lever 28 in the first angular direction A.

In particular, the pin 48 can be inserted in a seat 49 of the housing body 14, made from a hole 49 in the housing body 14, so that the pin 48 is preferably positioned parallel to the hinge pin 29 of the brake lever 28 and spaced from the latter, as illustrated in FIG. 7. The hole 49 can advantageously be the same hole (or opening) that allows access to the end stop adjustment device 33.

The pin 48 comprises a first portion 50 and a second portion 51, wherein the second portion 51 is equipped with a head 52 configured to be gripped by a user. The first portion 50 is equipped with a free end 53.

The pin 48 can be held inside the hole 49 for example by threading the hole 49 and the first portion 50 of the pin 48, or in combination, by inserting the free end 53 of the pin 48 in the interface 41 of the cam-type pin 34 of the end stop adjustment device 33 preferably by countershaping the free end 53 to the interface 41.

The pin 48 inserted in the hole 49 of the housing body 14 interferes with the brake lever 28 so as to prevent a rotation thereof in the second angular direction B.

Figure 8:
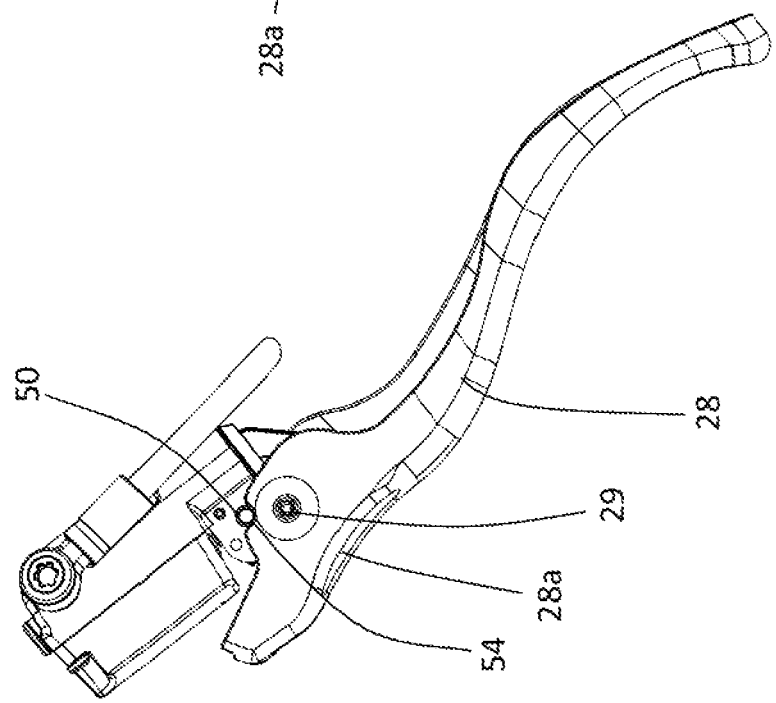
FIG. 8 is a side view of a detail of the control device of a brake illustrated in FIG. 6.

In particular, the brake lever 28 can comprise a recess 54 that partially surrounds the pin 48, preferably the first portion 50 of the pin 48 (as shown in FIG. 8 where the second portion 51 of the pin 48 has not been represented), so that the pin prevents the rotation of the brake lever 28 in the second angular direction B.

Figure 9:
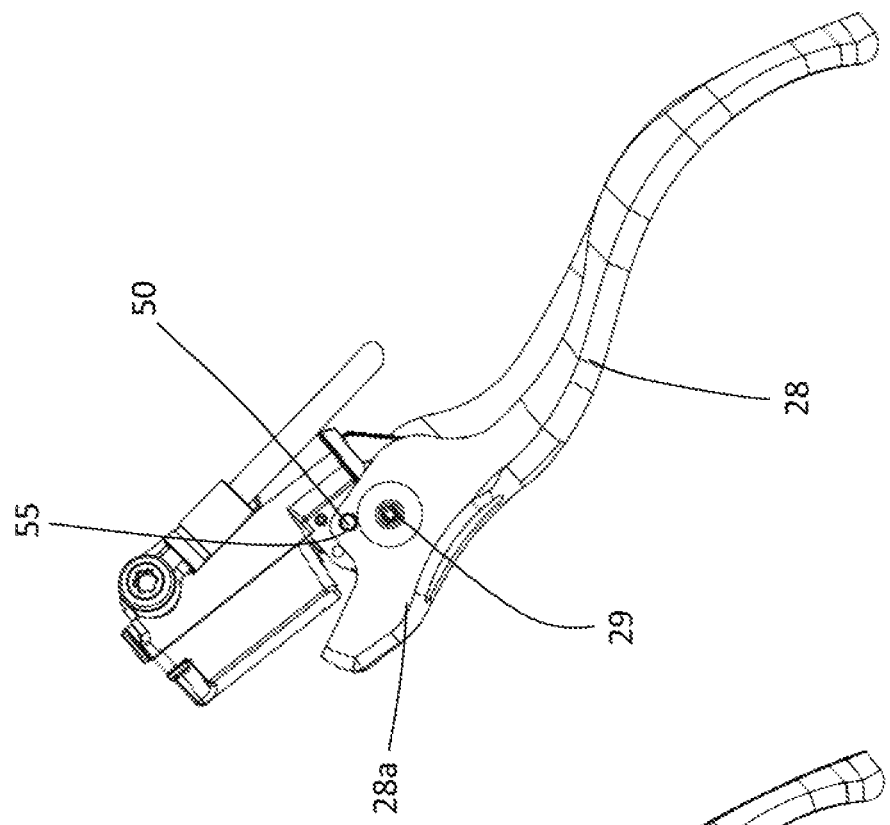
FIG. 9 is a variant embodiment of the detail of FIG. 8.

Alternatively, the brake lever 28 can comprise a hole 55 in which the pin 48 inserts. The hole 55 is coaxially with the hole 49 on the housing body 14 when the lever is partially actuated (as shown in FIG. 9 where the second portion 51 of the pin 48 has not been represented). In this way, the pin prevents any rotation of the brake lever 28.

As stated above, the actuation of the piston 18 in the storage and transportation position can be carried out by acting on the end stop adjustment device 33 instead of on the brake lever 28.

Figure 12:
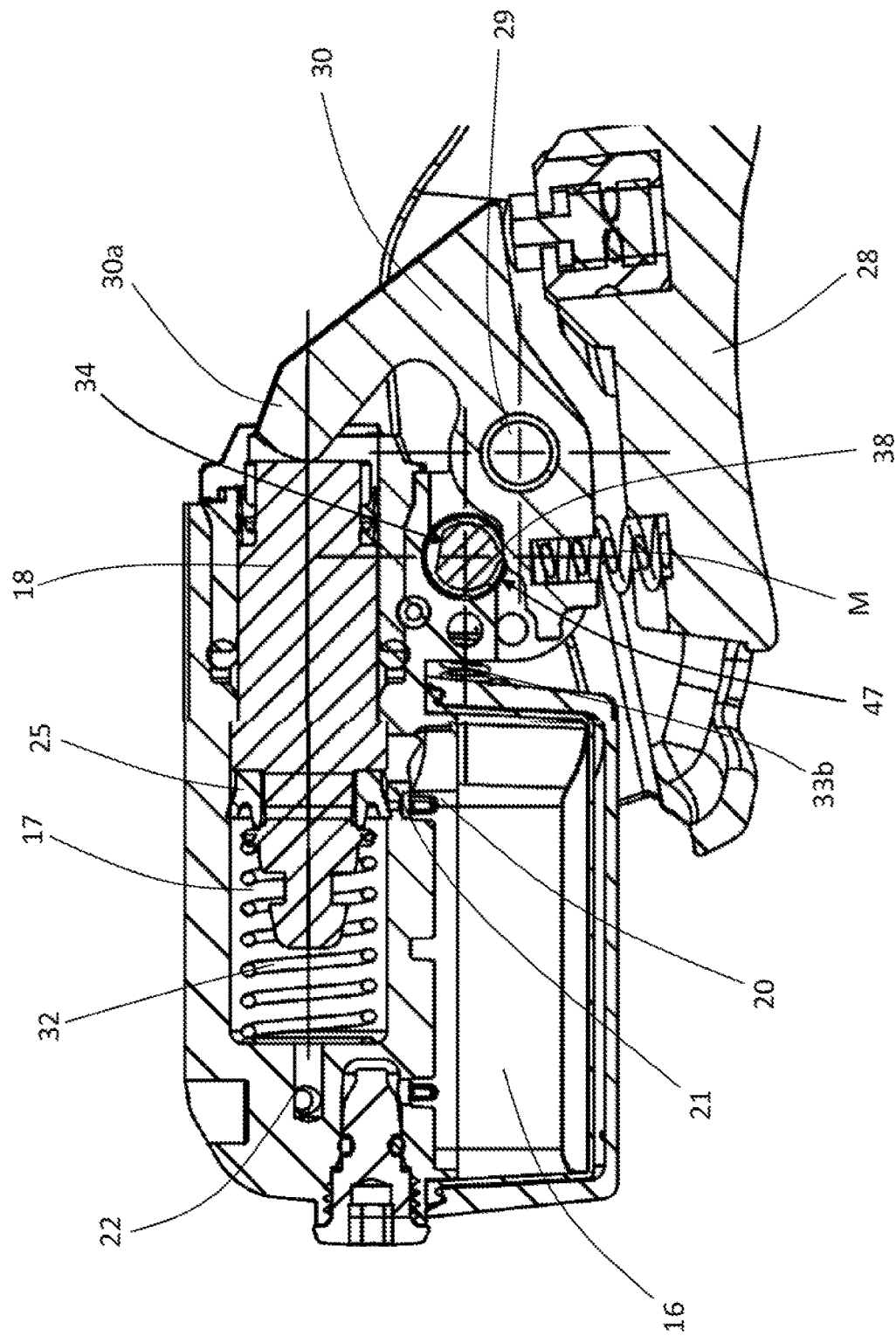

In this case, the operator rotates the cam-type pin 34 so that the projection 38 contacts the hammer 30 (as illustrated in FIG. 12). This causes a rotation of the hammer 30 that results in the storage and transportation position of the piston 18 being reached.

Indeed, it should be noted that the projection 38 is radially outer, with respect to a center of rotation of the cam-type pin 34, both than the flat portion 39 and than the cylindrical portion of the cam-type pin 34, and therefore the angular position reached by the hammer 30 is such that the piston 18 is closer to the inlet opening 21 of the cylinder 17 with respect to any other angular position taken up by the cam-type pin 34.

Leaving the end stop adjustment device 33 in the position reached, the piston 18 cannot go back into the rest position.

Once the piston 18 has reached and maintained the storage and transportation position, the control device is disconnected from the braking member 12.

This operation can be carried out by removing the connection of the brake tube 13 from the braking member 12 (for example by removing the clamping screw and disconnecting the coupling terminal from the hydraulic port 43) or by cutting the brake tube 13 close to the hydraulic port 43, as schematized in FIG. 1.

Preferably, the brake tube 13 is not disconnected from the control device 11. Therefore, a portion of the brake tube 13 remains connected and in fluid communication with the control device 11.

Moreover, in the case in which the brake tube 13 is cut, it is preferable to carry out such cutting as close as possible to the braking member 12, so as to leave a portion of brake tube 13 that is as long as possible coupled with the control device 11.

Hydraulic fluid does not leak from the free end of the brake tube 13 thus cut (or decoupled from the braking member), since the cylinder 17 is not in fluid communication with the tank 16.

On the free end of the brake tube 13 it is possible to insert a closing cap for additional safety and it is also possible to associate any device configured to facilitate the insertion of such a free end of the brake tube 13 inside a tube of the bicycle frame (in the case in which this was not necessary during the mounting of the braking system 10 on the bicycle), for example a hooking device of the free end.

It should be noted that hydraulic fluid also does not leak from the braking member 12, since the brake shoes 25 are not subjected to any force.

The braking member 12 can be equipped with a new deformable body to allow the future mounting of the braking system on the bicycle.

In order to proceed with the mounting of the braking system 10, the operator can proceed in the following way.

The control device 11 is mounted on the handlebars of the bicycle and the brake tube 13 connected to it is directed towards the portion of frame that will receive the braking member 12.

These two operations can be carried out in the order just described or in reverse order.

During the directing of the brake tube 13 towards the frame portion that will receive the braking member 12, the free end of the brake tube 13 can be passed inside the bicycle frame or outside of it as a function of the specific requirements and as a function of the frame type.

When the brake tube has been directed, the braking member 12 is connected to the free end of the brake tube 13. In this step the portion of brake tube 13 still connected to the hydraulic port 13 is removed if it has not already been. Then the brake tube is coupled with the hydraulic port 43 in the conventional manner quoted above taking care to cut the possible excess brake tube 13.

It should be noted that in this step the braking member 12 has not yet been arranged in operative position on the brake disc or on the rim of the wheel. In particular, the braking member 12 can be mounted on the bicycle frame but without the wheel of the bicycle being positioned. If the wheel of the bicycle were already mounted on the frame it is necessary to dismount it from the frame or couple the brake tube 13 with the braking member 12 with the latter not mounted on the frame.

This is necessary to bring the 45 of the braking member 12 back in rest position only after the brake tube 13 has been connected to the braking member 12.

Moreover, before bring the brake shoes 45 back into the rest condition and after having constrained the brake tube 13 to the braking member 12, it is necessary to remove the stop device 47 to allow the piston 18 to go back into the first rest position. This operation is necessary to allow the hydraulic fluid present in the hydraulic chamber 42 of the braking member 12 to flow back into the tank 16.

In this way the amount of oil preloaded in the system remains constant and by means of the repositioning of the brake shoes 45 of the braking member 12 the system goes back into a position in which it is ready for actuation.

The removal operation of the stop device 47 can be carried out by removing the pin 48 when the latter is provided.

When it is provided for the stop device 47 to be made from the end stop adjustment device 33, it is necessary to rotate the cam-type pin 34 to bring the slider 33a into engagement with one of the recesses 36.

What is claimed is:

1. A control device of a bicycle hydraulic brake, the control device comprising:
   a cylinder;
   a tank;
   a piston slidably mounted in the cylinder to move between at least one first rest position in which the cylinder and the tank are in fluid communication and at least one second position in which the piston interrupts the fluid communication between the cylinder and the tank;
   a pin that acts directly or indirectly on the piston; and,
   a seat for the pin,
   wherein the cylinder and the tank are filled with hydraulic fluid;
   wherein the pin assumes a storage and transportation configuration in which the pin arranges the piston in said at least one second position, and
   wherein the storage and transportation configuration is controlled by the insertion of the pin inside the seat and the removal of the pin from the seat.

2. The control device according to claim 1, wherein the pin in the storage and transportation configuration blocks any movement of the piston.

3. The control device according to claim 1, wherein the piston is biased towards the first position when the pin is not in the storage and transportation configuration.

4. The control device according to claim 3, wherein the pin is biased by a spring positioned between the piston and an outlet opening.

5. The control device according to claim 1, further comprising a housing body for the cylinder and the piston and a brake lever, active on the piston, hinged to the housing body and configured to rotate between a rest position in which the piston is in the first rest position and at least one active position in which the piston is in the second position, when the pin is in the storage and transportation configuration the pin is active on the brake lever to keep the piston in the at least one active position.

6. The control device according to claim 5, wherein the pin is active on the brake lever to prevent any rotation thereof.

7. The control device according to claim 6, wherein the pin interferes with the rotation of the brake lever and prevents the rotation of the brake lever at least towards the rest position.

8. A control device of a bicycle hydraulic brake, the control device comprising:
- a cylinder;
- a tank;
- a piston slidably mounted in the cylinder to move between at least one first rest position in which the cylinder and the tank are in fluid communication and at least one second position in which the piston interrupts the fluid communication between the cylinder and the tank;
- a stop pin that acts directly or indirectly on the piston;
- wherein the cylinder and the tank are filled with hydraulic fluid;
- wherein the stop pin moves to a storage and transportation configuration in which the stop pin movement places the piston in said at least one second position;
- an end stop adjuster defines at least two stable rest positions of the piston inside the cylinder, the end stop adjuster is configured to be switched between at least one first condition corresponding to the first rest position of the piston, a second condition corresponding to a second rest position of the piston and a third condition in which the piston interrupts the fluid communication between the cylinder and the tank;
- wherein movement of the end stop adjuster replaces the stop pin movement and places the storage and transportation configuration in said third condition.

9. A method for storing and transporting a bicycle hydraulic braking system, the method comprising:
providing a control device of a hydraulic brake comprising:
- a cylinder;
- a tank;
- a piston slidably mounted in the cylinder to move between at least one first rest position in which the cylinder and the tank are in fluid communication and at least one second position in which the piston interrupts the fluid communication between the cylinder and the tank;

providing a braking member comprising:
- a hydraulic chamber having a hydraulic port;
- at least one actuator that acts on at least one of a pair of brake shoes configured to couple with a respective pad;
connecting a brake tube to an outlet opening of the control device and to the hydraulic port of the braking member;
filling the control device, the brake tube and the braking member with a hydraulic fluid;
placing the piston of the control device in a storage and transportation position that coincides with the second position;
locking the piston to prevent movement to the first rest position; and after locking the piston to prevent movement to the first rest position, performing at least one of:
   (i) cutting the brake tube in a location between the control device and the braking member;
   (ii) disconnecting the brake tube from the hydraulic port of the braking member; or
   (iii) disconnecting the brake tube from the outlet opening of the control device.

10. A method for assembling a bicycle hydraulic braking system, the method comprising:
providing a hydraulic braking system having a controller having a hydraulic fluid chamber in communication with a hydraulic fluid transfer tube that communicates with a braking member; the hydraulic fluid chamber has a piston that controls fluid communication with the hydraulic fluid transfer tube;
positioning a stop pin to place the piston in a storage and transportation configuration;
installing the controller on bicycle handlebars;
positioning the hydraulic fluid transfer tube along a predetermined path towards the braking member;
cutting the hydraulic fluid transfer tube to a predetermined size and providing a free end reaches the braking member;
constraining the free end of the hydraulic fluid transfer tube in a fluid-tight manner to the braking member; and,
installing the braking member on a predetermined frame portion of the bicycle,
wherein after constraining the free end of the hydraulic transfer tube in a fluid-tight manner to the braking member, repositioning the stop pin and releasing the piston from the storage and transportation configuration.

11. The method according to claim 10, further comprising bringing brake shoes that are part of the braking member into a rest position after having constrained the free end of the hydraulic fluid transfer tube in a fluid-tight manner to the braking member.

* * * * *